United States Patent
Howorka

(10) Patent No.: US 7,363,268 B1
(45) Date of Patent: Apr. 22, 2008

(54) ANONYMOUS TRADING SYSTEM WITH IMPROVED QUOTE INPUT CAPABILITIES

(75) Inventor: Edward R. Howorka, Morris Plains, NJ (US)

(73) Assignee: EBS Dealing Resources, New York, NY (US)

( * ) Notice: Subject to any disclaimer, the term of this patent is extended or adjusted under 35 U.S.C. 154(b) by 989 days.

(21) Appl. No.: 09/707,824

(22) Filed: Nov. 7, 2000

Related U.S. Application Data

(63) Continuation of application No. 09/029,181, filed as application No. PCT/US96/14086 on Aug. 28, 1996, now Pat. No. 6,282,521.

(60) Provisional application No. 60/002,856, filed on Aug. 28, 1995.

(51) Int. Cl.
*G06F 17/00* (2006.01)

(52) U.S. Cl. .............................. 705/37; 705/35; 705/36

(58) Field of Classification Search .................. 705/37, 705/35, 36
See application file for complete search history.

(56) References Cited

U.S. PATENT DOCUMENTS

| | | | | |
|---|---|---|---|---|
| 4,412,287 A | | 10/1983 | Braddock, III | |
| 5,101,353 A | * | 3/1992 | Lupien et al. | 705/37 |
| 5,136,501 A | | 8/1992 | Silverman et al. | |
| 5,168,446 A | * | 12/1992 | Wiseman | 705/37 |
| 5,270,922 A | | 12/1993 | Higgins | |
| 5,297,031 A | * | 3/1994 | Gutterman et al. | 705/37 |
| 5,297,032 A | | 3/1994 | Trojan et al. | |
| 5,375,055 A | | 12/1994 | Tougher et al. | |
| 5,717,989 A | | 2/1998 | Tozzoli et al. | |
| 5,802,499 A | * | 9/1998 | Sampson et al. | 705/35 |
| 5,873,071 A | * | 2/1999 | Ferstenberg et al. | 705/36 R |
| 5,915,209 A | * | 6/1999 | Lawrence | 340/3.7 |
| 5,924,082 A | * | 7/1999 | Silverman et al. | 705/37 |
| 5,946,666 A | * | 8/1999 | Nevo et al. | 705/36 R |
| 5,950,177 A | * | 9/1999 | Lupien et al. | 705/37 |
| 5,963,923 A | * | 10/1999 | Garber | 705/37 |
| 6,014,627 A | | 1/2000 | Togher et al. | |
| 6,014,643 A | * | 1/2000 | Minton | 705/36 R |
| 6,115,698 A | | 9/2000 | Tuck et al. | |
| 6,282,521 B1 | * | 8/2001 | Howorka | 705/37 |
| 6,304,858 B1 | * | 10/2001 | Mosler et al. | 705/37 |
| 6,317,727 B1 | * | 11/2001 | May | 705/36 R |
| 6,343,278 B1 | * | 1/2002 | Jain et al. | 705/37 |

(Continued)

OTHER PUBLICATIONS

Howe, Charlie; Wiring the World; Datamation; p. 58, Oct. 1, 1984.*

(Continued)

*Primary Examiner*—Thomas A Beach
(74) *Attorney, Agent, or Firm*—Dickstein, Shapiro, LLP.

(57) ABSTRACT

A process for displaying quotes on a trader's screen used in an automatic trading system of the type which includes a plurality of traders. Some, but not all, of the traders have bilateral credit with one another, those traders having bilateral credit with one another being traded in counterparties. A quote made by the a first trader is displayed in the first trader's trading screen and when his quote can be accepted by more than one, but less than all trading counterparties, an indication of that fact is provided to him. In one embodiment, an indication is provided to the first trader of the percentage of trading counterparties that can accept his quote.

55 Claims, 4 Drawing Sheets

U.S. PATENT DOCUMENTS

| | | | | |
|---|---|---|---|---|
| 6,347,307 | B1* | 2/2002 | Sandhu et al. | 705/36 R |
| 6,408,282 | B1* | 6/2002 | Buist | 705/37 |
| 6,421,653 | B1* | 7/2002 | May | 705/37 |
| 6,519,574 | B1* | 2/2003 | Wilton et al. | 705/35 |
| 6,839,686 | B1* | 1/2005 | Galant | 705/36 |

OTHER PUBLICATIONS

Merrill Lynch's network add-on makes bid as a national market entry; Data Communications; p. 20, Dec. 1979.*

Seligman, Joel; Another unspecial study: the SEC's 'Market 2000' report and competitive developments in the United States capital markets. (Symposium on the Regulation of Capital Markets); Business Lawyer; v50; n2; p. 485-526, Feb. 1995.*

Duggal, P.S.; Hummingbird's Shares now Trade in NASDAQ National Market; PR Newswire; p. 425, Apr. 1994.*

Beauchamp, Marc; Individual Investor Orders Would be displayed in Best Quotew on NASDAQ under new proposal; PR Newswire; p. 925, Sep. 1995.*

Another First for Pro-Fac Cooperative: Prefered Stock Approved for NASDAQ; PR Newswire; p. 823, Aug. 1995.*

Hodges, John; NASDAQ launches the Small Order Execution System, for rapid execution of trades of up to 500 shares; PR Newswire, Dec. 1984.*

Bunting, J. Pearce; The changing securities game; Management Review; v79; n1; p. 64, Jan. 1990.*

OTC trading systems lead in race to automate (the National Association of Securities Dealers NASDAQ National Market System handles the top 2,610 over-the counter stocks); Wall street Computer Review; v8; n2; p. 31 (5), Nov. 1990.*

O'Heney, sheila; Can image processing preclude paper? (includes related article on desktop publishing); Computers in Banking; v5; n9; p. 32(5), Sep. 1988.*

Schmerken, Ivy; The electronic broker that could (Charles Schwab and Company Inc., Schwab Architecture Migration Strategy upgrade project); Wall Street Computer Review; v8; n12; p. 42(5), Sep. 1991.*

Automatching fully live on Hong Kong exchange; Financial Technology Insight; pN/A, Apr. 1994.*

Cohen, Norma; Competition comes to market: SIB's report sets out a blueprint for a new regulatory structure in London; Financial Times London Edition; p. 17, Jun. 1995.*

Beauchamp, Marc; Individual Investor orders would be displayed in best quote on NASDAQ under new proposal; PR Newswire; p. 925, Sep. 1995.*

Bonner, Paul; Do-It-Yourself: Windows Broker; PC Computing; v4; n6; p. 172(8), Jun. 1991.*

English, Larry P.; The new object databases at work; DBMS; v7; n3; p. 66(7), Mar. 1994.*

Yamada, Ken; Integrator digitizes stock trading transactions using PDA technology; Computer Reseller News; n638; p. 6, Jul. 1995.*

Corcella, Karen; Tomorrow's tools of the trade; Wall street & Technololgy; v10; n11; p. 50, Jun. 1993.*

Hoffmann, R. D. R.; A margin for the electronic broker; Personal Computing; p. 90(3), Oct. 1989.*

Corcella, Karen; Packing proprietary system for overseas; Wall Street & Technology; v11; n12; p. 14, Apr. 1994.*

Golden, Kathleen Golden; Toronto's Perpetual Project; Wall Street & Technology; v12; n9; p. 18(3), Mar. 1993.*

Barney, Lee; Will the futures industry live up to its standars?; Wall Street & Technology; v12; n15; p. 28(5), Jun. 1993.*

Gibbel, Stuart; Web ad networks give marketers a new option; NETmarketing, Sep. 1996.*

Schoonmaker, Sara; Trading On-Line: Information Flows in Advanced Capitalism; The Information Society; v9; n1; p. 39-49, Jan. 1993.*

Lennon, Michael J.; United States patent rights in financial services software; Computer Law & Practice; v10; n1; p. 17, Jan. 1994.*

Holzberg, Carol S.; Getting Started With Quicken: Part III; PC Novice; v6; n5; p. 48, May 1995.*

Cutting the cost of trading; Banking World; v7; n3; p. 45(3), Mar. 1989.*

Automating Financial Markets; Economist; v314; n7645; p. 19-24, Mar. 10, 1990.*

Seligman, Joel; Another unspecial study: the SEC's 'Market 2000' report and competitive developments in the United States capital markets. (Symposium on the Regulation of Capital Markets); Business Lawyer; vol. 50, No. 2, p. 485, 526, Feb. 1995.

Duggal, P.S.; Hummingbird's Shares no Trade in NASDAQ National Market; PR Newswire, p. 425, Apr. 1994.

Another First for Pro-Fac Cooperative: Preferred Stock Approved for NASDAQ; PR Newswire; p. 823, Aug. 1995.

Hodges, John, NASDAQ launches the Small Order Execution System, for rapid execution of trades of up to 500 shares; PR Newswire, Dec. 1984.

Bunting, J. Pearce; The changing securities game; Management Review; vol. 79, No. 1, p. 64, Jan. 1990.

Automatching fully live on Hong Kong Exchange; Finanical Technology Insight; p. n/a, Apr. 1994.

Bonner, Paul; Do-It-Yourself: Windows Broker; PC Computing; vol. 4, No. 6, p. 172(8), Jun. 1991.

English, Larry P.; The new object databases at work; DBMS; vol. 7, No. 3, p. 66(7), Mar. 1994.

Corcella, Karen; Tomorrow's Tools of the Trade; Wall Street & Technology, vol. 10, No. 11, p. 50, Jun. 1993.

Hoffmann, R.D.R., A margin for the electronic broker; Personal Computing, p. 90(3), Oct. 1989.

Barney, Lee; Will the futures industry live up to its standards?; Wall Street & Technololgy; vol. 12, No. 15, p. 28(5), Jun. 1993.

Gibbel, Stuart; Web ad networks give marketers a new option, NET Marketing, Sep. 1996.

Lennon, Michael J.; United States patent rights in financial services software; Computer Law & Practice, vol. 10, No. 1, p. 17, Jan. 1994.

Holzberg, Carol S.; Getting Started With Quicken: Part III; PC Novice; vol. 6, No. 5, p. 48, May 1995.

Cutting the cost of trading; Banking World, vol. 7, No. 3, p. 45(3), Mar. 1989.

Automating Financial Markets; Economist; vol. 314, No. 7645; pp. 19-24, Mar. 10, 1990.

* cited by examiner

ANONYMOUS TRADING SYSTEM WITH IMPROVED QUOTE INPUT CAPABILITIES

RELATED APPLICATIONS

This is a continuation of application Ser. No. 09/029,181, filed Jun. 15, 1998, now allowed, which is based upon PCT International Application No. PCT/US96/14086, filed Aug. 28, 1996, which claims priority to Provisional Application No. 60/002,856, filed Aug. 28, 1995.

TECHNICAL FIELD

The present invention is directed generally to computerized trading systems and more particularly to a method and apparatus for anonymous trading wherein an individual offer is made available only to a subset of the available counterparties.

BACKGROUND ART

In many computerized trading systems, the participants (individual traders or institutions) are qualified in advance by an exchange and each offer is broadcast from one participant to all other qualified participants.

When the subject of the trade is a commodity (such as wheat or copper) or a financial instrument (such as Treasury Bills or foreign currency), multiple offers for the same commodity or instrument are conventionally ranked by price per unit. Depending on the trading conventions in effect, offers at the same price may be further ranked by size and/or time in a queue of available offers; however, for any given commodity or financial instrument, only one offer is at the head of an associated queue.

Under many market conditions, "market makers" (institutions and/or individual traders whose open offers are available to other traders) will set a price at or slightly above the best price currently available, with the expectation that their offer will reach the head of the relevant queue in due course. However, if there is a sudden change in market conditions, the market maker may wish to cancel or modify his outstanding offer before it reaches the head of the queue. To that end, it is known to warn the trader responsible for an open quote when his quoted price is equal to the best price currently available and/or when his offer reaches the head of queue. Similarly, if the maker's quote was ready to be accepted (ie, it is the highest ranked quote in the system) but is subsequently bettered by another maker, the original maker may be given an opportunity to revise his offer or remove it from the market.

In the traditional voice broker foreign exchange market, the broker announces "Your bid" to a market maker when the maker's own quote is at the head of the queue; the broker also (optionally) announces and/or cancels that quote when someone else submits a better price.

In an anonymous electronic brokerage system such as the EBS system or Reuters 2000-2 in which individual trades of foreign currency are settled directly between two banks (or "trading floors") rather than through an exchange or a clearing house, the identity of the parties is kept confidential until an offer from one party has been matched to a bid from another party and the matching criteria include not only price, but also the existence of bilateral credit between the two parties. Thus, unlike a traditional voice broker who processes only one quote at a time. (typically the first offer in the queue) and who provides both parties with an opportunity to accept or reject a potential trade after the parties have already been identified, a computerized matching process is able to perform many tasks concurrently and to use objective matching criteria (such as preestablished counterparty credit limits) without divulging any confidential credit information. Moreover, at least the known EBS system operates in a credit screened market in which a price is not offered to a potential counterparty unless it is "Dealable"— ie, each party to the potential transaction has previously indicated a willingness to deal with the other party. Thus there is no longer a single queue for a given currency, but a separate logical queue (typically containing only a subset of the open quotes for each trading floor). Accordingly, the known EBS system displayed an active quote on the maker's terminal in a red background (a so-called "Red Quote") if that quote was either the best Dealable (or the best regular size Dealable) quote on at least one trading floor, ie, the quote was at the head of some floor's queue of "Dealable" quotes, thereby providing the maker with a signal that his quote has the potential of being about to be accepted. In addition to the visible warning (the quote is displayed on a red background), the EBS voice says "Your bid/offer" and the background of the key fields on the transaction panel turns from yellow to red. Preliminary versions of the EBS system also provided an indication if a quote was "joined" with a Red Quote, ie was in the Dealable queues of at least one trading floor and was equal to the best price that was Dealable to that floor, but was not at the head of the Dealable queue on any trading floor, and thus did not qualify as a Red Quote.

However, as a result the lack of credit between many possible pairs of trading partners and the fact that market makers are reluctant to make an offer that is substantially worse than the best price that is currently available, almost every quote is at the head of the queue on at least one trading floor, and thus the indication that a quote was Dealable on at least one trading floor had limited practical value.

A quote that lost its red status (as indicated by the transaction panel fields turning from red to yellow) is said to be "bettered". If the "Cancel When Bettered option" in the trader profile is set, such a bettered Red Quote was automatically canceled by the EBS system.

More recent versions of the EBS system have also included a capability for aggregating a regular size (typically US$10 Million) Dealable quote from several quotes for smaller quantities to display a synthetic "regular" size Dealable price whose individual components had priority in time and/or price over any other available quotes. In that case, the "regular Dealable price" would be equal to the worst priced component of the aggregated deal.

DISCLOSURE OF INVENTION

For each quote entered into the system by a market maker, the system determines if it is waiting to be "hit" (about to be accepted) at a substantial number of trading floors, and if so, notifies the trader originating the quote.

In accordance with one aspect of the invention, the substantial number of floors is preferably expressed as greater than a predetermined percentage of the available trading partners with whom credit has been established on a bilateral basis, and is preferably greater than 25%.

In accordance with another aspect of the invention, a quote is considered about to be accepted at a particular trading floor if it would be included as a component in an order at the Regular Dealable price currently available to that trading floor.

In accordance with yet another aspect of the invention, the system provides the market maker with a quantitative indication as to how many trading floors (or percentage of available trading partners) are about to accept his quote, and/or how good his quote must be to be Hittable by a given number of trading floors (or percentage of available trading partners).

BRIEF DESCRIPTION OF THE DRAWINGS

Other objects and features of the present invention will be apparent from the following description of a presently preferred embodiment taken in connection with the accompanying drawings, in which.

DETAILED DESCRIPTION OF EXEMPLARY EMBODIMENT

Figure 1:
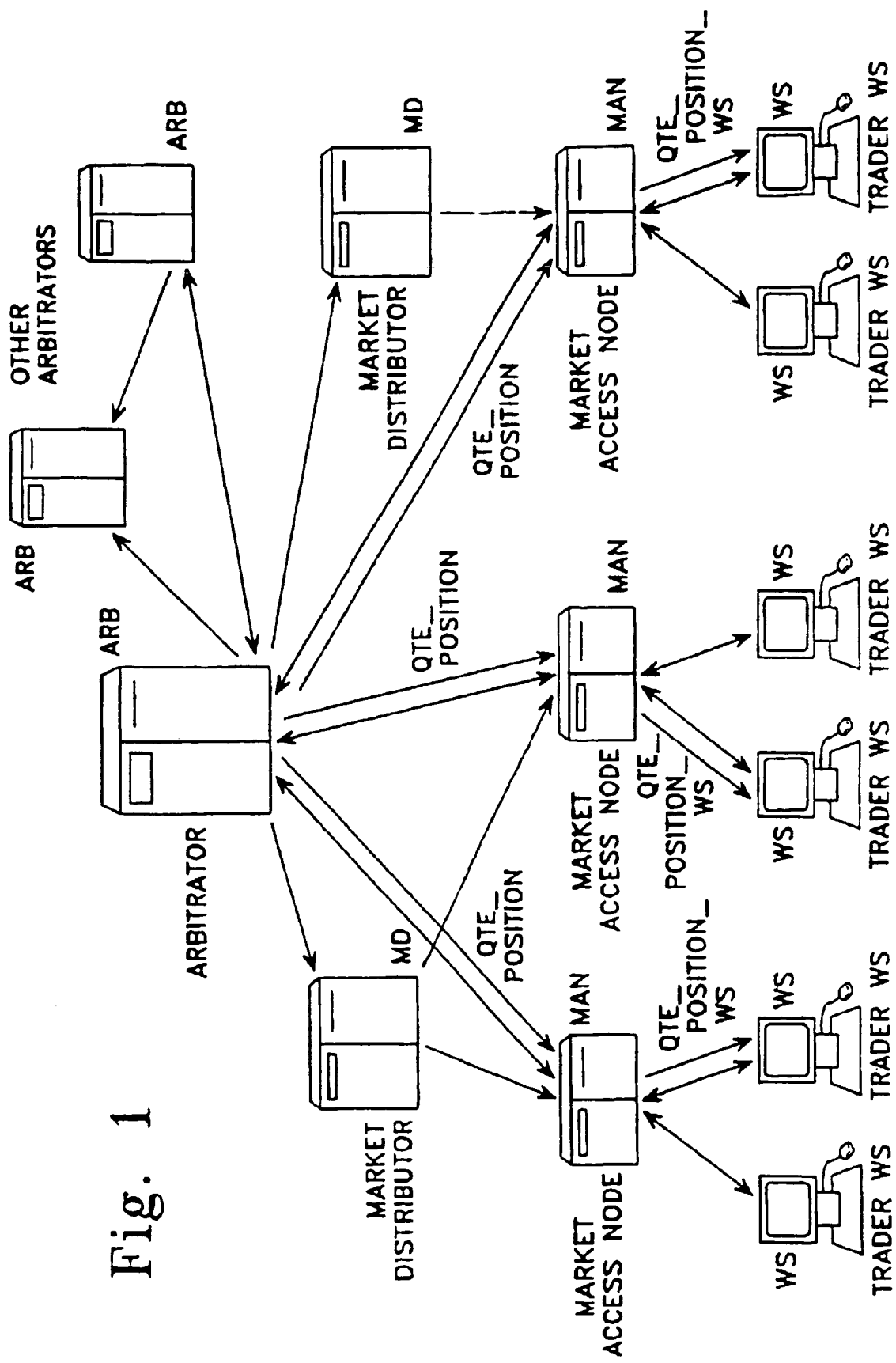
FIG. 1 is a functional overview of a computerized trading system in accordance with the present invention showing the sources of the data used to calculate the quote status message and how the status message is transmitted from the Arbitrator to the workstation.

FIG. 1 is a functional overview of the EBS system modified in accordance with the present invention. An early version of the EBS system is described in more detail in U.S. Pat. No. 5,375,055, which is hereby incorporated by reference.

The Arbitrator node ARB computes and maintains the status of all open quotes and sends QtePosition messages to the maker's Mark Access Node (bank node) MAN signaling any changes in the status of a quote. If a trader uses the Cancel When Bettered option, the QtePosition message also can be used by the bank node MAN to determine when his quote needs to be canceled.

Figure 2:
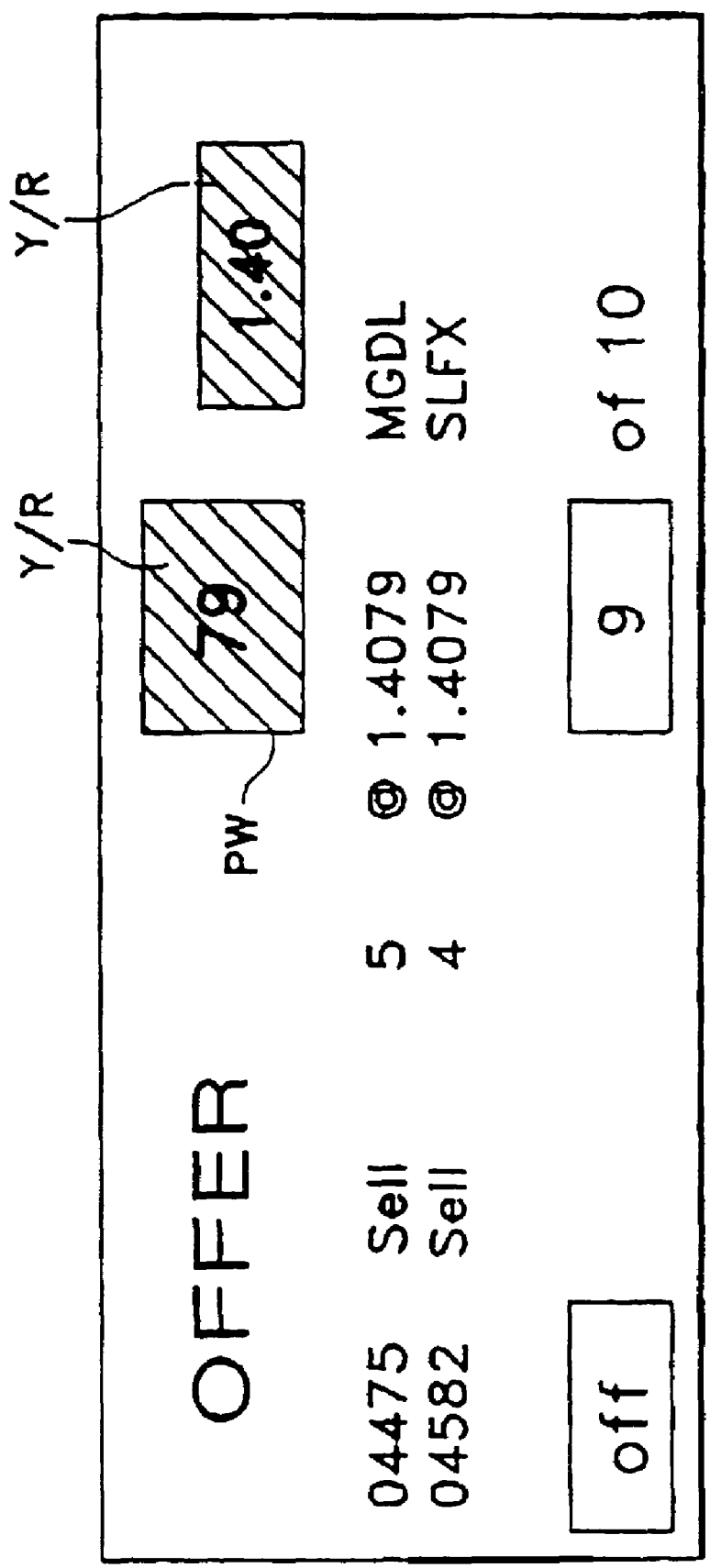
FIG. 2 shows the Transaction Panel of the known EBS system, which may be used without modification with the present invention.

Upon receiving the QtePosition message, the maker's bank node MAN sends the QtePositionWS message to the Workstation WS. The Workstation then processes the QtePositionWS message, updating the quote status display (FIG. 2) or canceling the quote, as appropriate.

The processing of the QtePosition and QtePositionWS messages may be conventional and unchanged from prior versions of the EBS system. In particular, when the status of an active quote on the Maker's Transaction Panel (FIG. 2) changes from normal (logical 0) to red (logical 1), the background color Y/R of the box PW containing the least significant digits of the quoted price ("80" in the illustrated example) as well as the smaller box containing the Big Figure amount (1.40) changes from yellow to red. When the status changes from red to normal, either the quote is withdrawn (if Cancel When Bettered is active) or the background changes from red to yellow.

A quote is "Hittable" from a trading floor, if a regular size hit from that floor would be automatically matched with some part of the quote. In the described embodiment, a quote is "red" if it is Hittable from more than the specified percentage of the trading floors which have bilateral credit with the submitter of the quote. The percentage is a global system parameter, with a default value of 25%.

Suppose that the regular amount is 10M and that the following bids are available (Dealable) to a trading floor X (ranked by decreasing price and then by increasing time of submission): Note that in foreign currency trading, the price is conventionally expressed in "pips" [least significant digits of base currency for a predetermined quantity of local currency], that the amount is conventionally expressed in millions of US dollars, and that a quote can be either a single sided bid to buy the local currency, or a single-sided offer to sell the local currency, or a two-sided bid and offer [separated by a spread].

| Quot  | Price | Amount | Mak r   |
|-------|-------|--------|---------|
| Bid 1 | 65    | 5 M    | Floor A |
| Bid 2 | 60    | 3 M    | Floor B |
| Bid 3 | 20    | 4 M    | Floor C |
| Bid 4 | 20    | 5 M    | Floor D |

The first three bids are Hittable from floor X, while Bid 4 is not.

Bid 3, for example, is Hittable from floor X because a regular size hit (Sell 10 M at 20) from that floor would match a part (2M) of that bid. If Bid 3 is Hittable from enough floors (25% of the trading floors which have bilateral credit with Floor C), then Bid 3 is red at the maker's transaction panel.

Figure 3:
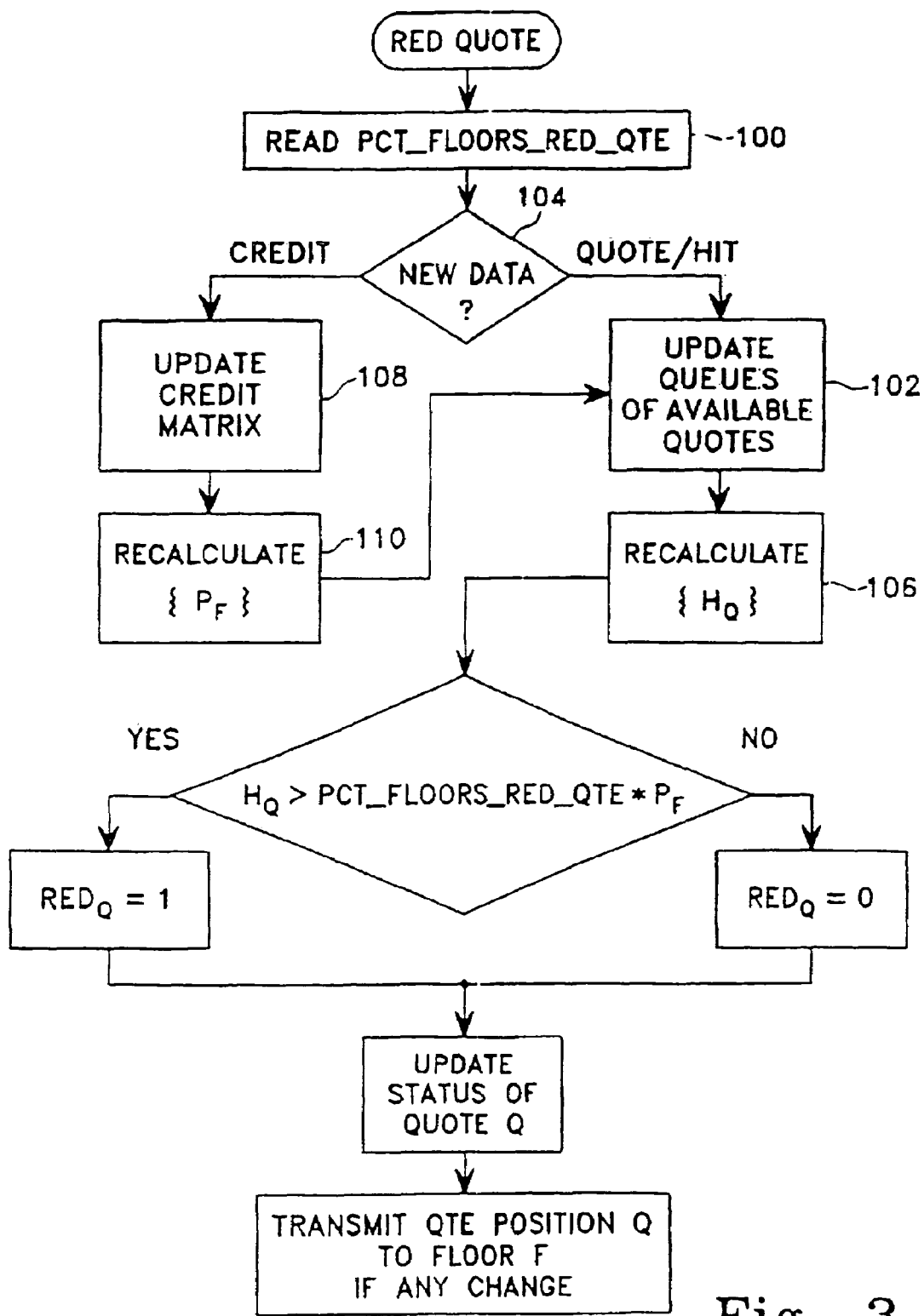
FIG. 3 is a functional block diagram of the software which determines the current Red Quote status for a particular quote.

Reference should now be made to FIG. 3, which is a functional block diagram of the "Red Quote" software in the Arbitrator ARB which determines the current Red Quote status for a particular quote.

As part of the startup process, the Arbitrator reads (block 100) the parameter PctFloorsRedQte from the Arbitrator section of the GLOBAL.DAT file. This is the partner floor percentage determining whether a quote is red.

In known fashion, the Arbitrator maintains (block 102) for each trading floor that is currently logged into the network, a queue in the form of a linked list of pointers to atomic data objects (individual quotes), with each queue being ordered by price and time and the objects in the queue being those quotes that are currently available to that trading floor. The queues are updated each time a new quote is received or its status is changed (it has been accepted or withdrawn, or it has been tentatively matched pending credit verification and acknowledgment by both parties) (Quote/Hit branch from decision block 104) and each time the bilateral credit status between any two trading floors changes (Credit branch from decision block 104).

In addition, in accordance with the present invention, for each quote Q, the Arbitrator uses the data in the trading floor queues to maintain (block 106) a respective count of floors $H_Q$ from which the quote can be hit by a regular size buy/sell request (typically ten million US dollars).

The Arbitrator also maintains in known fashion (block 108) a credit availability matrix containing the bilateral credit status between each pair of trading floors that are currently connected to the system, which is then used to update the quote queues for any affected trading floors (block 102). In accordance with the present invention, for each floor F, the Arbitrator also uses the data in the credit availability matrix to maintain (block 110) the count of its partners $P_F$ (i.e., other floors that have bilateral credit with the given floor).

The Arbitrator thus is able to dynamically adjust both counts ($H_Q$ and $P_F$) in response to any trading or credit messages, and determine (block 112) for each quote whether the quote's $H_Q$-count is higher than a predetermined percentage (defined initially as 25%) of the $P_F$-count for the floor that submitted the quote. The result of this test is stored with the other data concerning that particular quote (block 114), and if the Red Quote status has changed, the QtePosition message is transmitted to the trading floor's bank node MAN (block 116).

The above operations may be clarified with a few numerical examples.

When PctFloorsRedQte=25 (current default value) and P=195, then a quote is red if it is Hittable from more than (195*25)/100=4875/100=48 floors. This illustrates that the above definition of red status requires a strict inequality.

When PctFloorsRedQte=25, and P=4, then a quote is red if it is Hittable from more than (4*25)/100=100/100=1 floors.

When PctFloorsRedQte=0, a quote is red if it is Hittable from one or more floors. Thus, with this setting of the global parameter, the above definition of Red Quote is very similar to that used in the known EBS system.

When PctFloorsRedQte=100, no quote is ever red. All active quotes should appear "yellow."

From the foregoing description and examples, it should be apparent that the Red Quote status, as defined above, depends on both the ranking of the quote relative to other quotes in the market and on the bilateral credit relationship of the submitting floor with other floors, and that the Arbitrator ARB dynamically re-computes the Red Quote status of quotes any time that any of these factors is affected (due, for example, to better prices being submitted or new credit being granted by another floor).

Figure 4:
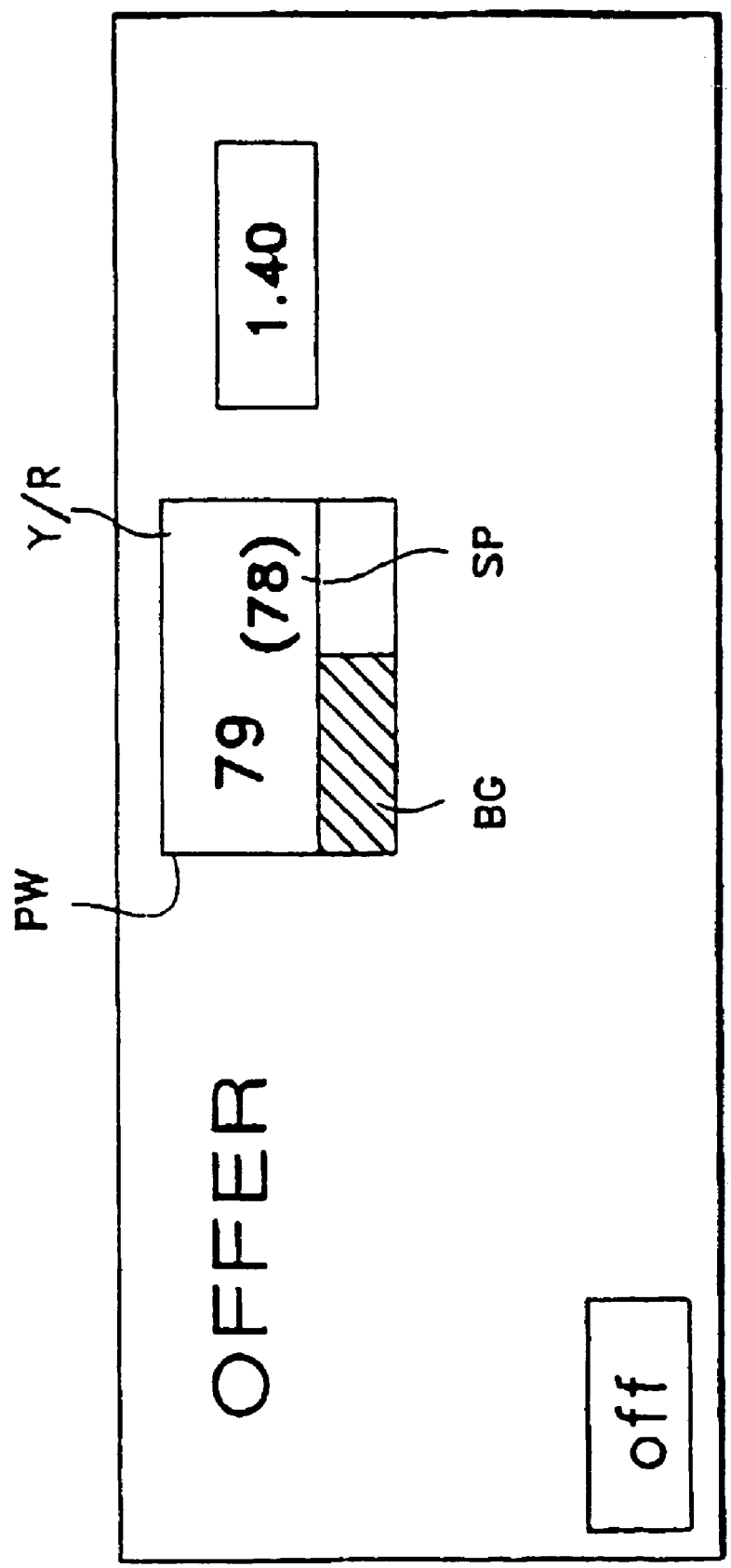
FIG. 4 shows an alternate embodiment for the Transaction Panel in which the ratio of Hittable floors to available partners is displayed as a horizontal bar graph below the quote, and a numerical indication of what price would be required to be Hittable at a given percent of available trading partners is shown above the quote.

FIG. 4 shows an alternate embodiment of the invention in which rather that comparing the variable $H_Q$ with a predetermined percentage of the variables $P_F$, the Arbitrator computes the ratio $H_Q/P_F$, and includes that ratio in the quote status message QtePosition each time the ratio changes by a predetermined increment (for example, 5%). In that case, rather than indicating the status of the active quote as merely normal or red, the workstation can display it as a number or in graphical form. In the illustrated example, the ratio is displayed as a horizontal bar graph BG below the quote, which in the illustrated example extends about ⅔ of the full width of the pips window PW indicating that that price is Hittable by about 65% of the maker's available (on line and with established credit) trading partners.

As also shown in FIG. 4, the market maker may also (or alternatively) be provided with a numerical indication SP of what price would be required to be Hittable at a predetermined percent of available trading partners (for example, the same percentage PctFloorsRedQte as was used in FIG. 3). This could be readily computed by generating an ordered list of the worst Hittable prices (ie, the price required to complete the lowest ranking component of a regular sized deal) from the quotes of each available trading partner. Since the available partners are already identified in the credit matrix, and since each queue already contains a pointer to the last component of the aggregated regular Dealable price, such a display would not require substantial additional computation, and would provide the market maker with additional assurances that his quote was competitive with other quotes in the market and was priced neither too high nor too low.

It should be apparent that the ratio $H_Q/P_P$ and the numerical price indication SP will change at a greater frequency than the Red Quote status RIY. Accordingly, In a system having Market Distributor nodes MD as shown in FIG. 1 which use a price queue similar to that maintained in the Arbitrator ARB for computing Dealable prices and transmitting them to the individual trading floors MAN, performing the required computations in a more distributed fashion (in the Market Distributors) will make better use of the communication network.

Doubtless, other variations on the concepts underlying the present invention will be apparent to those skilled in the art.

What is claimed is:

1. A process for displaying quotes on a trading screen used in an automated trading system on which a plurality of trading entities trade, some, but not all, of the trading entities having bilateral credit with one another, those trading entities having bilateral credit with one another being trading counterparties, the process comprising:

displaying a quote made by a first trading entity on at least one trading screen associated with the first trading entity; and providing an indication to the first trading entity that its quote can be accepted by a predetermined number which is more than one but less than all of the first trading entity's trading counterparties, wherein the first trading entity has bilateral credit with another trading entity as a function of an amount of remaining credit a first credit granting entity, which is associated with the first trading entity, has extended to a second credit granting entity, which is associated with the other trading entity.

2. The process of claim 1, wherein each of the first trading entity's trading counterparties can accept the first trading entity's quote only if it is the best quote available to such trading counterparty.

3. The process of claim 2, wherein the first trading entity's quote is the best available quote to each of its respective trading counterparties if it is the best price available to such trading counterparty.

4. The process of claim 3, wherein the first trading entity's quote is equal in price to another quote which is available to the first trading entity's trading counterparty, but the first trading entity's quote is first in time relative to such other quote.

5. The process of claim 3, wherein the trading entities with whom the first trading entity has bilateral credit changes over time and wherein a determination is made as to which parties are trading counterparties on a real time basis.

6. The process of claim 1, wherein the predetermined number is a percentage.

7. The process of claim 6, wherein the percentage is determined by:

determining the number of trading counterparties who can accept the first trading entity's quote; and comparing that number to the total number of the first trading entity's trading counterparties.

8. The process of claim 6, wherein said predetermined percentage is at least 25%.

9. The process of claim 1, wherein each trading entity is a respective trading floor.

10. The process of claim 1, wherein each trading entity is a single individual.

11. The process of claim 2, wherein a determination is made as to whether the quote is the best as a function of the price of the quote and the time that it was made.

12. The process of claim 1, wherein:
the automated trading system determines, for each trading entity, a regular best price available to that trading entity, the regular best price being the best price available from one or more of that trading entity's trading counterparties totaling an amount equal to a standard size order; and
each trading entity can accept the regular best price available to that trading entity; and
the first trading entity's quote can be accepted by any of its trading counterparties if that quote is all or part of the regular best price available to that trading counterparty.

13. The process of claim 12, wherein the best price available is determined as a function of the price of the quote and the time that the quote was submitted.

14. The process of claim 1, wherein the first and second credit granting entities are respective trading floors.

15. The process of claim 1, wherein the trading entities are the credit granting entities.

16. The process of claim 1, wherein the trading screen is associated with an individual, and wherein the trading entities are trading floors, whereby the indication to the first trading entity is provided to the trading screen associated with the individual.

17. A process for displaying quotes on a trading screen used in an automated trading system of the type on which a plurality of trading entities trade, some, but not all, of the trading entities having bilateral credit with one another, those trading entities having bilateral credit with one another being trading counterparties, the process comprising:
displaying a quote made by a first trading entity on the first trading entity's trading screen; and
providing an indication to the first trading entity of the percentage of the first trading entity's trading counterparties that can accept its quote,
wherein the first trading entity has bilateral credit with another trading entity as a function of an amount of remaining credit a first credit granting entity, which is associated with the first trading entity, has extended to a second credit granting entity, which is associated with the other trading entity.

18. The process of claim 17, wherein each of the first trading entity's trading counterparties can accept the first trading entity's quote only if is the best quote available to such trading counterparty.

19. The process of claim 18, wherein the first trading entity's quote is the best available quote to each of the first trading entity's trading counterparties if it is the best price available to such trading counterparty.

20. The process of claim 19, wherein the first trading entity's quote is equal in price to another quote which is available to one of the first trading entity's trading counterparties, but the first trading entity's quote is first in time.

21. The process of claim 20, wherein the trading entities with whom the first trading entity has bilateral credit changes over time and wherein a determination is made as to which parties are trading counterparties on a real time basis.

22. The process of claim 17, further including:
determining the number of trading entities who are trading counterparties with the first trading entity;
determining the percentage of the first trading entity's trading counterparties who can accept the first trading entity's quote; and
providing the indication to the first trading entity of the percentage of trading counterparties that can accept his quote as a function of such determination.

23. The process of claim 22, wherein the predetermined percentage is at least 25%.

24. The process of claim 22, wherein the indication is provided by displaying a numerical indication of the percentage on the first trading entity's trading screen.

25. The process of claim 22, wherein the indication is provided by providing a graphical indication of the percentage on the first trading entity's trading screen.

26. The process of claim 25, wherein the graphical indication is a designated area of the screen and the percentage is indicated by filling in a portion of the designated area of the screen corresponding to the percentage.

27. The process of claim 17, wherein each trading entity is associated with a respective trading floor, each trading floor grants credit to other trading floors and wherein the trading entity has bilateral credit with another trading entity when the trading floors associated with the two trading entities have bilateral credit with one another.

28. The process of claim 17, wherein each trading entity is an individual.

29. The process of claim 18, wherein a determination is made as to whether the quote is the best as a function of the price of the quote and the time that it was made.

30. The process of claim 17, wherein:
the automated trading system determines, for each trading entity, a regular best price available to that trading entity, the regular best price being the best price available from one or more of that trading entity's trading counterparties totaling an amount equal to a standard size order; and
each trading entity can accept the regular best price available to that trading entity; and
the first trading entity's quote can be accepted by any of its trading counterparties if that quote is all or part of the regular best price available to that trading counterparty.

31. The process of claim 30, wherein the best price available is determined as a function of the price of the quote and the time that the quote was submitted.

32. A process for displaying quotes on a trading screen used in an automated trading system on which a plurality of trading entities trade, some, but not all, of the trading entities having bilateral credit with one another, those trading entities having bilateral credit with one another being trading counterparties, the process comprising:
displaying a quote made by a first trading entity on at least one trading screen associated with the first trading entity; and
providing an indication to the first trading entity that at least a portion of its quote can be accepted by a predetermined number which is more than one but less than all of the first trading entity's trading counterparties,
wherein the first trading entity has bilateral credit with another trading entity as a function of an amount of remaining credit a first credit granting entity, which is associated with the first trading entity, has extended to a second credit granting entity, which is associated with the other trading entity.

33. The process of claim 32, wherein each of the first trading entity's trading counterparties can accept at least a portion of the first trading entity's quote only if it is the best quote available to such trading counterparty.

34. The process of claim 33, wherein the first trading entity's quote is the best available quote to each of its respective trading counterparties if it is the best price available to such trading counterparty.

35. The process of claim 34, wherein the first trading entity's quote is equal in price to another quote which is available to the first trading entity's trading counterparty, but the first trading entity's quote is first in time relative to such other quote.

36. The process of claim 32, wherein the predetermined number is a percentage.

37. The process of claim 36, wherein the percentage is determined by:
 determining the number of trading counterparties who can accept at least a portion of the first trading entity's quote; and
 comparing that number to the total number of the first trading entity's trading counterparties.

38. The process of claim 32, wherein each trading entity is a respective trading floor.

39. The process of claim 33, wherein a determination is made as to whether the quote is the best as a function of the price of the quote and the time that it was made.

40. The process of claim 32, wherein:
 the automated trading system determines, for each trading entity, a regular best price available to that trading entity, the regular best price being the best price available from one or more of that trading entity's trading counterparties totaling an amount equal to a standard size order; and
 each trading entity can accept the regular best price available to that trading entity; and
 the first trading entity's quote can be accepted by any of its trading counterparties if that quote is all or part of the regular best price available to that trading counterparty.

41. The process of claim 40, wherein the best price available is determined as a function of the price of the quote and the time that the quote was submitted.

42. A process for displaying quotes on a trading screen used in an automated trading system of the type on which a plurality of trading entities trade, some, but not all, of the trading entities having bilateral credit with one another, those trading entities having bilateral credit with one another being trading counterparties, the process comprising:
 displaying a quote made by a first trading entity on the first trading entity's trading screen; and
 providing an indication to the first trading entity of the percentage of the first trading entity's trading counterparties that can accept at least a portion of its quote,
 wherein the first trading entity has bilateral credit with another trading entity as a function of an amount of remaining credit a first credit granting entity, which is associated with the first trading entity, has extended to a second credit granting entity, which is associated with the other trading entity.

43. The process of claim 42, wherein each of the first trading entity's trading counterparties can accept at least a portion of the first trading entity's quote only if is the best quote available to such trading counterparty.

44. The process of claim 43, wherein the first trading entity's quote is the best available quote to each of the first trading entity's trading counterparties if it is the best price available to such trading counterparty.

45. The process of claim 44, wherein the first trading entity's quote is equal in price to another quote which is available to one of the first trading entity's trading counterparties, but the first trading entity's quote is first in time.

46. The process of claim 42, further including:
 determining the number of trading entities who are trading counterparties with the first trading entity;
 determining the percentage of the first trading entity's trading counterparties who can accept at least a portion of the first trading entity's quote; and
 providing the indication to the first trading entity of the percentage of trading counterparties that can accept at least a portion of his quote as a function of such determination.

47. The process of claim 46, wherein the predetermined percentage is at least 25%.

48. The process of claim 46, wherein the indication is provided by displaying a numerical indication of the percentage on the first trading entity's trading screen.

49. The process of claim 46, wherein the indication is provided by providing a graphical indication of the percentage on the first trading entity's trading screen.

50. The process of claim 49, wherein the graphical indication is a designated area of the screen and the percentage is indicated by filling in a portion of the designated area of the screen corresponding to the percentage.

51. The process of claim 42, wherein each trading entity is associated with a respective trading floor, each trading floor grants credit to other trading floors and wherein the trading entity has bilateral credit with another trading entity when the trading floors associated with the two trading entities have bilateral credit with one another.

52. The process of claim 42, wherein each trading entity is an individual.

53. The process of claim 43, wherein a determination is made as to whether the quote is the best as a function of the price of the quote and the time that it was made.

54. The process of claim 42, wherein:
 the automated trading system determines, for each trading entity, a regular best price available to that trading entity, the regular best price being the best price available from one or more of that trading entity's trading counterparties totaling an amount equal to a standard size order; and
 each trading entity's can accept the regular best price available to that trading entity; and
 the first trading entity's quote can be accepted by any of its trading counterparties if that quote is all or part of the regular best price available to that trading counterparty.

55. The process of claim 54, wherein the best price available is determined as a function of the price of the quote and the time that the quote was submitted.

* * * * *